Patented Oct. 24, 1922.

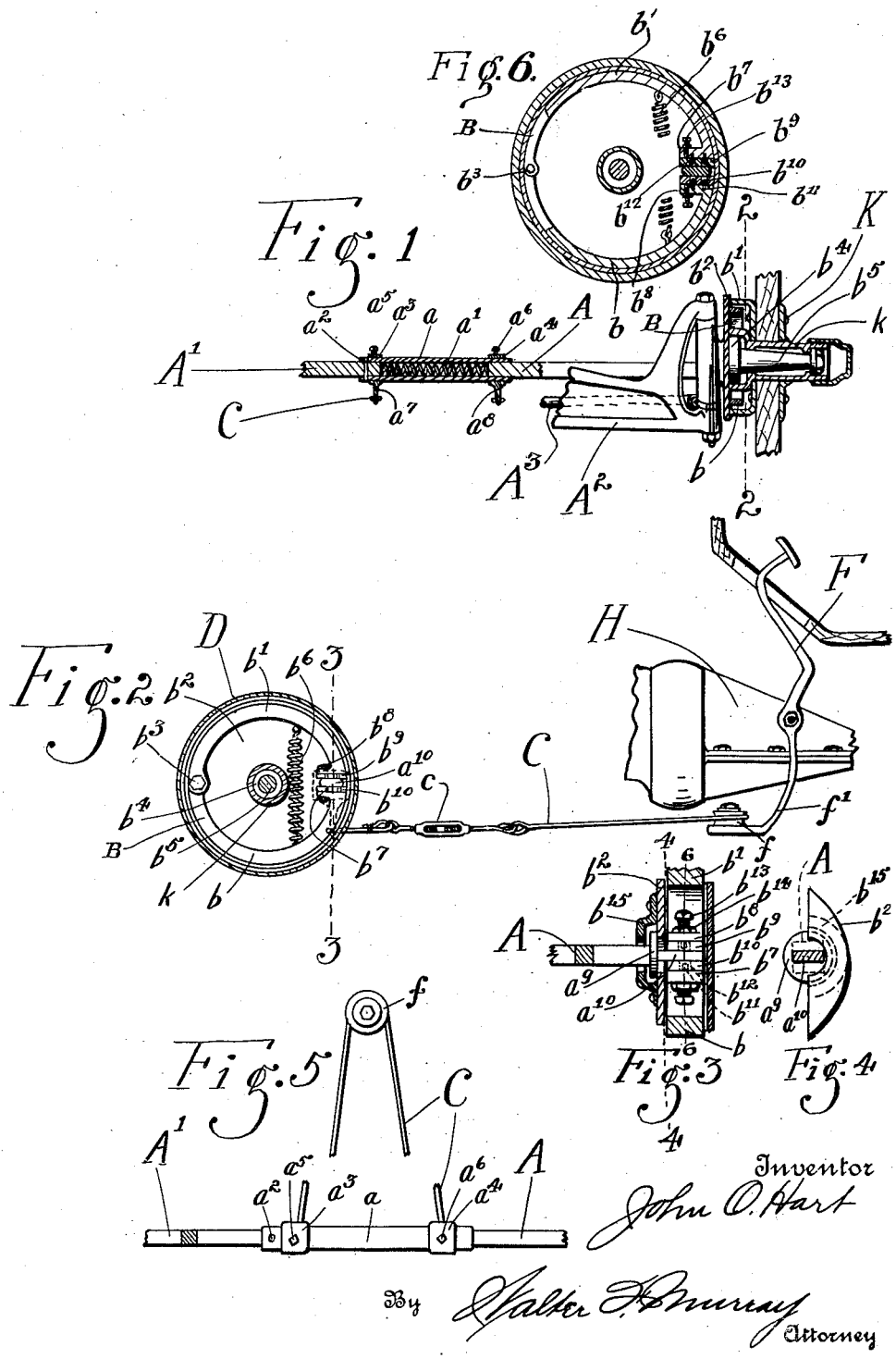

1,433,132

UNITED STATES PATENT OFFICE.

JOHN O. HART, OF CINCINNATI, OHIO.

SAFETY BRAKE DEVICE FOR VEHICLES.

Application filed July 23, 1920. Serial No. 398,397.

*To all whom it may concern:*

Be it known that I, JOHN O. HART, a citizen of the United States of America, and resident of Cincinnati, in the county of Hamilton and State of Ohio, have invented a new and useful Improvement in Safety Brake Devices for Vehicles, of which the following is a specification.

An object of my invention is to provide a brake for the front steering wheels of a vehicle that will cooperate with the brakes operating upon the rear wheels mounted on an axle that is fixed upon such vehicle, thereby providing an additional and an efficient safety appliance.

Another object is to provide a brake that is especially adaptable to the front wheels of automobiles.

These and other objects are attained by the means described herein and disclosed in the accompanying drawings in which:

Fig. 1 is a front elevation of part of an automobile to which a device embodying my invention has been applied.

Fig. 2 is a sectional view on line 2—2 of Fig. 1, parts being broken away.

Fig. 3 is an enlarged sectional view on line 3—3 of Fig. 2.

Fig. 4 is a sectional view on line 4—4 of Fig. 3.

Fig. 5 is a plan view of a section of a device embodying my invention.

Fig. 6 is a sectional view on line 6—6 of Fig. 3.

My invention comprises a cam shaft A—A' that is rotatably actuated by the manipulation of the foot lever F thereby engaging the brake shoe B upon the drum D upon the front wheels of a vehicle, simultaneously with the operation of the brake upon the transmission shaft. Although I have shown my device as applied to an automobile in which the foot brake operates upon the transmission shaft, it may be applied to any other type of automobile by attaching both rear and front wheel brake mechanisms to the same foot lever.

The cam shaft A—A' is mounted adjacent and parallel to the axle $A^2$ and connecting rod $A^3$ and is supported by the brake shoe B in the drum D. The cam shaft is cut at its center and the two adjacent ends thereof are reciprocatingly contained within the sleeve $a$ and are held apart by the spring $a'$ contained within the sleeve. The cam shaft and sleeve are preferably square in cross section so that shaft A—A' and the sleeve will rotate in unison. The outer ends of the cam shaft A—A' lie between the flanges $b^7$ and $b^8$ formed on the ends of the brake shoe B and serve to expand the upper and lower portion of the brake shoe when the cam shaft is revolubly actuated. A pin $a^2$ extends through one end of the sleeve and through section A' of the cam shaft, to avoid displacement of these parts and developing a telescopic cam shaft, or a telescopic joint. The collars $a^3$ and $a^4$ are mounted upon the sleeve $a$ equidistant from the center of the cam shaft and are secured thereto by means of the set screws $a^5$ and $a^6$ and have the downwardly projecting lugs $a^7$ and $a^8$ respectively to which the ends of the cable C are attached. Sections A and A' of the cam shaft are constructed similarly. The flange $a^9$ and cam $a^{10}$ are formed on the outer ends of the cam shaft A—A'.

The cable C at its middle extends around the pulley $f$ mounted on the arm $f'$ formed on the foot lever F that operates the brake upon the transmission shaft (not shown) contained within the housing H. The cable C and lugs $a^7$ and $a^8$ need not be in the same positions as shown, but must be in such a position that the operation of the foot lever F will cause the cable to rotatably move the cam shaft. The pulley $f$ acts as an equalizer in that it permits the movement of the front wheels to steer the vehicle, yet the brake will be immediately subject to any movement of the lever F. The turn buckle $c$ permits adjustment of the cable length.

The brake shoe B comprises the lower segment $b$ and upper segment $b'$ mounted at one of their respective ends upon the pivot $b^3$ attached to plate $b^2$ mounted upon the stationary cone $b^4$ formed on spindle $b^5$ upon which the hub $k$ of the wheel K is mounted. The spring $b^6$ is attached at its ends to the interior surface of the segments $b$ and $b'$ and serves to normally contract the brake shoe. The flanges $b^7$ and $b^8$ formed on the unattached ends of the segments $b$ and $b'$ respectively have the adjustment plates $b^9$ and $b^{10}$ mounted thereon. The plates $b^9$ and $b^{10}$ are secured in position by the pins $b^{11}$ projecting from the flanges $b^7$ and $b^8$ and engaging in slots $b^{12}$ in the adjustment plates. Adjustment screws $b^{13}$ having lock nuts $b^{14}$ mounted thereon, extend through the flanges and engage the adjustment plates, whereby the brake shoe segments may be adjusted to assume positions closer to or farther from the drum, whereby the shoes may be brought into engagement with the drum at various degrees of movement of the foot lever, and also varying the tension of the spring $b^6$. Cam $a^{10}$ extends between plates $b^9$ and $b^{10}$.

The drum D is of the usual construction employed in drums that are mounted upon the rear wheels of automobiles, and is attached to the front wheel similarly to the attachment of such drums to rear wheels. The drum engages the plate $b^2$ and serves as a housing for the cam $a^{10}$ and the brake shoe. Brake lining is placed in the drum upon which the brake shoe operates.

The operation of my device is as follows:

When the lever F is actuated, thereby operating upon the drive shaft within the housing H, the lever arm $f'$ is moved away from shaft A—A'. The movement of the lever arm is transmitted to the cable C, thereby causing the cable to pull the lugs $a^7$ and $a^8$ upon sleeve $a$, such movement of the lugs and sleeve actuating the cam shaft rotatably. The cams $a^{10}$ on the cam shaft turn between the adjustment plates on the brake shoe segments thereby spreading the brake shoe and causing the shoe to engage the drum.

When the machine is moving in other than a straight line, the pulley $f$ permits the cable to adjust itself to the movement of the cam shaft so that the brakes on the front wheels will act regardless of the position of the wheels. The spring $b^6$ returns the parts to their normal positions. The flange $a^9$ on the cam shaft is contained between the collar $b^{15}$ and plate $b^2$, thereby avoiding dislocation of the parts. The spring $a'$ serves to hold apart the cam shaft parts A and A'.

What I claim is:

1. The combination with a lever controlling a brake adapted to operate upon the transmission shaft of an automobile, of a brake adapted to operate upon the steering wheels of the automobile and comprising a lever arm on the lever, a cam shaft the opposite ends of which are operative upon the brakes on the steering wheels, and a cable connecting the lever arm and the cam shaft.

2. The combination with a lever controlling a brake adapted to operate upon the transmission shaft of an automobile, of a brake operative upon the steering wheels of an automobile and comprising drums mounted on the steering wheels, brake shoes operative upon the drums, a cam shaft the opposite ends of which are adapted to move the shoes into engagement with the drums, and a cable connecting the lever arm and the cam shaft.

3. The combination with a lever controlling a brake adapted to operate upon the transmission shaft of an automobile, of a brake operative upon the steering wheels of an automobile and comprising a lever arm mounted on the lever, a pulley on the lever arm, a cam shaft, and a cable secured to the cam shaft and engaging the pulley.

4. The combination with a lever controlling a brake adapted to operate upon the transmission shaft of an automobile, of a brake adapted to operate upon the steering wheels of an automobile and comprising a lever arm on the lever, brakes on the steering wheels, a telescopic cam shaft engaging the brakes on the steering wheels, and a connecting means mounted on the lever arm and the cam shaft.

5. In a brake for wheels having spindles the combination with brakes operative upon the wheels, of a telescopic cam shaft operative upon the brakes, and a lever controlling the telescopic cam shaft.

6. In a brake for a pair of wheels having movable but non-revoluble spindles, the combination with drums mounted on the wheels, of brake shoes mounted upon the spindle and adapted to engage the drums, a cam shaft engaging the brake shoes on both spindles, and means to actuate the cam shaft.

7. In a brake for wheels having spindles, the combination with drums mounted on the wheels, of brake shoes mounted upon the spindles, a telescopic cam shaft engaging the brake shoes and adapted to move the shoes into engagement with the drums, and a lever adapted to revolubly actuate the cam shaft.

8. In a brake for wheels having spindles, the combination with drums mounted on the wheels, of brake shoes operative upon the drums, a telescopic cam shaft operative upon the brake shoes, lugs extending from the cam shaft, a lever, a pulley mounted on the lever and a cable attached at its ends to the lugs and engaging the pulley.

9. In a brake for wheels having spindles, the combination with drums mounted on the wheels, plates mounted on the spindles, brake shoes pivotally mounted on the plates and operative upon the drums, a telescopic cam shaft extending through the plates and operative upon the brake shoes, flanges on the cam shaft, collars mounted on plates and each securing a flange between itself and one of the plates, lugs on the cam shaft, a lever, a pulley on the lever and a cable attached at its ends to the lugs and engaging the pulley.

10. In a brake for wheels having spindles, the combination with brakes operative upon the wheels, of a revoluble telescopic cam shaft operative upon the brakes, and means to rotatably actuate the cam shaft.

11. In a device of the class described the combination of a pair of wheels, brakes operative on the wheels, a revoluble telescopic cam shaft operative on the brakes, and means to revolubly actuate the cam shaft.

In witness whereof, I have hereunto subscribed my name this 20th day of July, 1920.

JOHN O. HART.